L. W. SOUTHGATE.
METHOD OF AMPLIFYING ELECTRIC CURRENTS.
APPLICATION FILED JULY 10, 1908. RENEWED OCT. 14, 1910.
992,817.
Patented May 23, 1911.
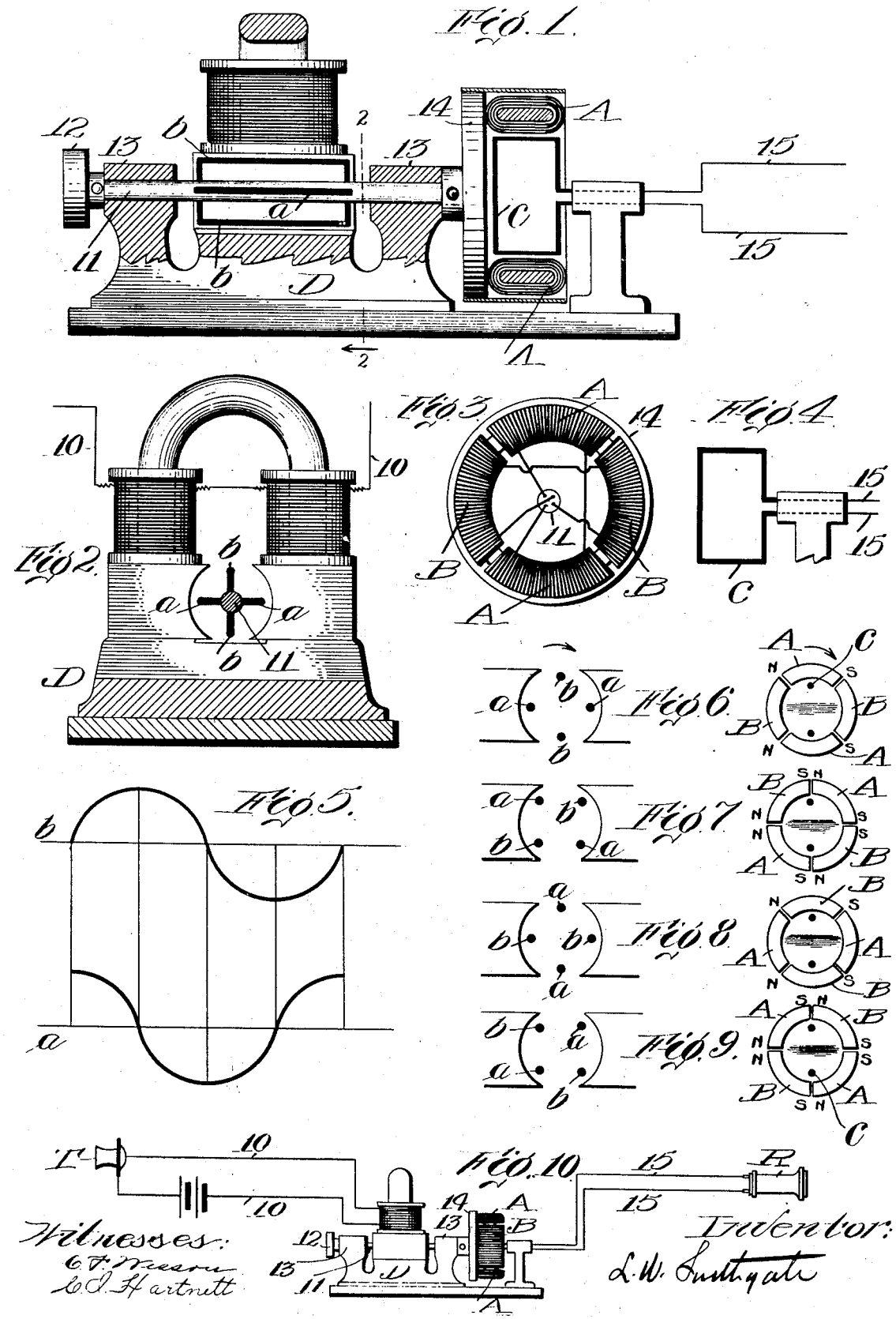

UNITED STATES PATENT OFFICE.

LOUIS W. SOUTHGATE, OF WORCESTER, MASSACHUSETTS.

METHOD OF AMPLIFYING ELECTRIC CURRENTS.

992,817.  Specification of Letters Patent.  Patented May 23, 1911.

Application filed July 10, 1908, Serial No. 442,852. Renewed October 14, 1910. Serial No. 587,120.

*To all whom it may concern:*

Be it known that I, LOUIS W. SOUTHGATE, a citizen of the United States, residing at Worcester, in the county of Worcester and State of Massachusetts, have invented a new and useful Method of Amplifying Electric Currents, of which the following is a specification.

The object of this invention is to provide an improved method of generating electricity by power which shall overcome the difficulties of current commutation and collection.

The invention is particularly directed to the production of an electric generator which shall have neither a commutator nor a collector, whereby the same is particularly adapted for use as a relay in telephone work, telegraph work, wireless telegraphy and in that class of musical instruments like telharmoniums employing electric undulations.

It has heretofore been proposed to use an electric generator for a telephone relay by connecting the generating current to the field and by attempting to utilize the current induced in the armature as the generated current. In this application or use of an electric generator it is necessary to use a direct current generator so that the current generated in the armature will have the characteristics of the generating current applied to the field. The ordinary type of direct current generator employs a commutator for the purpose of commutating or rectifying the currents created in the armature coils and this commutation or rectification of the currents leads to a vibration or pulsation of the generated current and to other well known commutator troubles which interfere with current amplification and which introduce factors of error. It has also been proposed to use a unipolar or homopolar generator for the purpose of relaying or amplification but the unipolar or homopolar generator necessarily employs collectors either rings and brushes or mercury cups and these collectors bring in errors and microphonic action which interfere with the use of this type of generator for the purposes stated. I have discovered that these difficulties can be overcome by using the well known rotary field effect produced by a varying current generator, such as an alternator or pulsator, by leading or directing the lines of force of the magnetic field into inductive relation with a stationary coil or coils, and by physically or mechanically moving or rotating a member or the members forming a part or controlling the position of the magnetic field, so that the lines of force of the magnetic field as they act on the stationary coil or coils will have a stationary relation therewith, whereby the moving or rotating magnetic field will act as the primary, and said stationary coil or coils will act as the secondary of a stationary transformer or induction coil. This new method may be practiced with many forms of generators and rotary fields, and I have shown in the drawings the same practiced with a simple two-phase alternator, and with an ordinary ring arrangement of the coils in which the rotary magnetic field is created, which ring is connected to rotate physically or mechanically in opposition to the magnetic rotation of the rotary field. The armature of the alternating current generator is preferably connected to turn with or to form one rotating member with the said mechanically rotating field whereby the connections between the said armature and said field are permanent and do not involve the use of collectors. By this principle, if a constant direct current be applied to the field of the alternating current generator, the lines of force in the rotary field will remain constant and stationary in space and no current will be induced in the stationary secondary of the transformer. But now if the field of the alternating current generator be changed as by introducing a varying current, the current generated in the armature of the alternating current generator will be correspondingly varied and hence the lines of force in said rotary field will also be varied, whereby the current changes in the field of the alternating current generator will be reproduced in the secondary of the transformer. As the current generated in the armature may be made many times larger than the current in the field of the generator, the rotating field may be made much more powerful than the field of the alternating current generator and as the transformer can be made to take most of the energy of these changes, an amplification is obtained which will preserve the characteristics of the generating current and the apparatus will not have any of the evils or errors of commutation or collection of current.

A full understanding of the invention can be had from the accompanying drawings in which, Figure 1 is a sectional elevation of an apparatus empirically arranged to practice the invention. Fig. 2 is an end elevation of the generator. Fig. 3 is a front elevation of the rotating field. Fig. 4 is an elevation of the secondary of the transformer. Fig. 5 is a diagrammatic view illustrating the phase arrangement employed in the generator. Figs. 6 to 9, inclusive, are diagrams illustrating the operation, and Fig. 10 is a diagram showing the application of the device to a telephone circuit.

Referring to the drawing and in detail, D represents an alternating current generator having a bipolar field which is energized by a circuit 10—10. Rotating in this field are two coils $a$—$a$ and $b$—$b$. These coils are shown in the drawings as simple loops for the purpose of explanation but in operation they are made of a number of windings or loops as in the ordinary armature practice so that the current generated by the rotation of the armature will be much larger than the current in the field. These coils are set at right-angles or at 90 degrees to each other so that the usual 90 degree two-phase relation will be obtained as indicated in Fig. 5.

11 designates the shaft which carries the armature coils, which shaft may have a pulley 12 on the end thereof to which power may be applied and which shaft may run in bearings 13—13. Secured on the end of the shaft 11 is a disk 14 of non-magnetic material on which are secured circumferentially, four coils A—A and B—B which coils are arranged in the manner common in alternating current motors wherein the rotary field principle is utilized. The coils A—A are oppositely wound and are connected together by a cross wire and the armature coils $a$—$a$ are connected to the other end of the coils A—A. The coils B—B are oppositely wound and are connected together by a cross wire and the armature coils $b$—$b$ are connected to the other ends of the coils B—B. The connections between the armature coils $a$—$a$ and $b$—$b$ and the coils A—A and B—B may be arranged inside of the shaft 11 and therefore form permanent connections which rotate with the armature and rotary field. The field comprised by the coils A—A and B—B is arranged to form the primary of a transformer, the secondary of which is formed by a stationary coil C arranged inside of the rotary field. The stationary coil C is designated in Fig. 4 by a single loop but in practice the same will be made of as many convolutions or turns as desired. The secondary C is connected to wires 15—15 which form part of the circuit in which the generated current is utilized. By the above construction it will be seen that the field of the transformer will turn with the armature of the alternating current generator. The relation of the windings of the coils A—A and of the coils B—B is such that the rotating magnetic field will turn or rotate in opposition to the mechanical or physical rotation of the field, whereby the lines of force in the field or primary of the transformer will stand stationary in space.

The operation is represented diagrammatically for a half revolution in Figs. 6 to 9, inclusive. In Fig. 6 coil $a$—$a$ is at its maximum and coil $b$—$b$ is at its minimum. Therefore, there will be created between the field coils a field of force which will be substantially horizontal as indicated at the right hand side in Fig. 6. Now suppose the armature turns 45 degrees or one-eighth of a revolution in the direction indicated by the arrow and to the position shown in Fig. 7. The current now generated in the coils $a$—$a$ will be less and a current will be generated in the coils $b$—$b$ which will energize the coils B—B of the field. This will cause a shifting of the lines of force in the field to the resultant position obtained by the action of both sets of coils A—A and B—B and the coils are wound as previously described so that this shifting will take place in opposition to the armature rotation. This will cause the shifting of the lines of force forty-five degrees in one direction around the coils but as the coils mechanically turn 45 degrees in the other direction, the lines of force will remain stationary in space as indicated at the right in Fig. 7. During the next eighth revolution of the armature the current generated in coils $b$—$b$ will come to the maximum and the current generated in the coils $a$—$a$ will fall to the minimum and hence the lines of force will rotate magnetically in the coils 45 degrees in opposition to the mechanical rotation thereof, but as the mechanical rotation equals the magnetic rotation, the lines of force will remain stationary, as indicated at the right in Fig. 8. During the next eighth revolution or 45 degrees turn of the armature coils, a current will be generated in the coils $a$—$a$ but in the opposite direction to that previously described and the current will fall in the coils $b$—$b$. This will cause a further magnetic shifting of the lines of force of the field 45 degrees in opposition to the mechanical rotation of the coils and as the mechanical rotation is equal in opposition to the magnetic rotation, the lines of force will continue stationary.

The action previously described for a half revolution will be repeated for the next half revolution of the armature in the opposite direction but without displacement of the position of the lines of force in the field in space. Therefore, the result of this opposite magnetic and mechanical rotation of the field will be to keep the rotary field stationary in space and as the rise and fall of the current in the two sets of coils is relatively opposite, there will be no change in the intensity of said field. Therefore, so long as there is a constant direct current in the circuit 10—10 and therefore in the field of the alternating current generator, there will be no change in the position or in the intensity of the lines of force in the field of the transformer. The current in the field of the transformer will be as much more powerful than the current in the field of the alternating current generator as the generator relation between the said field of the alternating current generator and its armature produces, whereby the strength of the field in the transformer can be made many times the strength of the field in the alternating current generator. Now, if the current which is impressed upon the circuit 10—10 be varied either in intensity or in direction, the lines of force in the rotary field will be correspondingly varied and when this takes place a current will be induced in the secondary C which will follow the characteristics of the current variation in the generating circuit 10—10. Hence any current change either in intensity or in direction in the generating circuit 10—10 will be truthfully followed in the secondary C of the transformer with increased power. Hence the creation of any current variation in circuit 10—10 will be truthfully amplified in circuit 15—15 and this action will take place without commutation and collection of the current as the action is entirely electrical and as all connections are permanent. If a source of electricity as a battery be introduced in the circuit 10—10 and if a telephone transmitter T be interposed therein as shown in Fig. 10, a receiver R can be interposed in the circuit 15—15 and the current changes given by the transmitter can be amplified for use in the receiver R.

The device is eminently fitted for amplification in connection with varying currents such as are used in telephone work, wireless telegraphy and other uses hereinbefore specified.

I have shown for illustration the invention as applied to a simple two-phase alternating current generator but in practice I prefer to use many more than two coils in the armature and properly connect the coils to the rotating field, so as to compensate for self-induction and other factors which may be encountered. As I use the term "polyphase alternating current generator," I mean to cover any style of alternating current generator and connections which will produce what is known as a rotating magnetic field.

The device herein shown and described may be greatly varied by a skilled electrician without departing from the scope of the invention as expressed in the claims.

Having thus fully described my invention, what I claim and desire to secure by Letters-Patent is:—

1. The method of amplifying electric currents, which consists in utilizing the generating current to vary the field of a varying current generator, utilizing the current generated in the armature thereof to create a moving magnetic field, leading or directing the lines of force of the magnetic field into inductive relation with a stationary coil or coils, and mechanically or physically moving a member or the members forming a part or controlling the position of the magnetic field, so that the lines of force of the magnetic field as they act on the stationary coil or coils will have a stationary relation therewith, whereby the moving magnetic field will act as the primary, and the stationary coil or coils will act as the secondary of a stationary transformer or induction coil.

2. The method of amplifying electric currents, which consists in utilizing the generating current to vary the field of a varying current generator, utilizing the current generated in the armature thereof to create a rotating magnetic field, leading or directing the lines of force of the magnetic field into inductive relation with a stationary coil or coils, and mechanically or physically rotating a member or the members forming a part or controlling the position of the magnetic field, so that the lines of force of the magnetic field as they act on the stationary coil or coils will have a stationary relation therewith, whereby the rotating magnetic field will act as the primary, and the stationary coil or coils will act as the secondary of a stationary transformer or induction coil.

3. The method of amplifying electric currents, which consists in utilizing the generating current to vary the field of a varying current generator, utilizing the current generated in the armature thereof to create a rotating magnetic field in a series of coils, leading or directing the lines of force of the magnetic field into inductive relation with a stationary coil or coils, and mechanically or physically rotating the series of coils so that the lines of force of the magnetic field as they act on the stationary coil or coils will have a stationary relation therewith, whereby the rotating magnetic field will act as the primary, and the stationary coil or coils as the secondary of a stationary transformer or induction coil.

4. The method of amplifying electric currents, which consists in utilizing the generating current to vary the field of a varying current generator, utilizing the current generated in the armature of said generator to create a rotating magnetic field, physically rotating a member or the members of the magnetic field in opposition to its magnetic rotation, and impressing the lines of force of said rotary field to induce a current in a stationary secondary.

5. The method of amplifying electric currents, which consists in applying the generating current to the field of a polyphase alternating current generator, utilizing the currents generated in the armature of said generator to create a rotating magnetic field, physically rotating the coils of said field in opposition to its magnetic rotation so that the lines of force thereof will stand stationary in space, and utilizing said lines of force to energize the secondary of a transformer, the primary of which is formed by said rotating field.

6. The method of amplifying electric currents, which consists in applying the generating current to the field of a polyphase alternating current generator, utilizing the currents generated in the armature of said generator to create a rotating magnetic field, the coils of which are connected to rotate with said armature and which coils are connected to said armature by permanent electrical connections, the physical rotation of the coils of said field being in opposition to its magnetic rotation, whereby the lines of force thereof will stand stationary in space, and applying said rotary field as the primary of a transformer, the secondary of which is stationary and connected to the circuit in which the generated current is to be utilized whereby current changes in the generating circuit will be amplified in the generated circuit.

7. The combination of a varying current generator, coils connected to the armature thereof so that a moving magnetic field will be created, a stationary coil or coils arranged in inductive relation with said moving magnetic field, and means for mechanically or physically moving a member or the members forming a part or controlling the position of the magnetic field, so that the lines of force of the magnetic field as they act on the stationary coil or coils will have a stationary relation therewith.

8. The combination of a varying current generator, coils connected to the armature thereof so that a rotating magnetic field will be created, a stationary coil or coils arranged in inductive relation with said rotating magnetic field, and means for mechanically or physically rotating a member or the members forming a part or controlling the position of the magnetic field, so that the lines of force of the magnetic field as they act on the stationary coil or coils will have a stationary relation therewith.

9. The combination of a polyphase alternating current generator, coils connected to the armature thereof so that a rotating magnetic field will be created, means for rotating the coils mechanically in opposition to the magnetic rotation of the field, and a coil arranged adjacent to said rotary field so that the said rotary field and said coil will form a transformer.

10. The combination of a polyphase alternating current generator, having an electromagnetic field to which the generating circuit is connected, a series of circumferentially arranged coils connected to turn with the armature of the generator and electrically connected to the armature coils so that a rotating magnetic field will be created in said coils, which field will rotate magnetically in opposition to the mechanical rotation of the coils, whereby the lines of force of said field will stand stationary in space, and a coil stationarily held in said rotating field and connected to the circuit in which the generated current is to be employed.

11. The combination of a generating circuit, a polyphase alternating current generator to the field of which said generating circuit is connected, coils connected to rotate with said armature and electrically connected to the armature coils so that a rotary magnetic field will be created in said coils which will rotate in opposition to the mechanical rotation of said coils, whereby the lines of force of said field will stand stationary in space, a secondary coil placed in said lines of force, and a circuit in which the generated current is to be employed connected to said stationarily held coil, whereby current changes in the generating current will be amplified in the circuit in which the generated current is to be employed.

12. The combination of an alternating current polyphase generator to the field of which a generating current is applied, a disk rotating with the armature of said generator, coils arranged circularly around said disk and connected electrically to the coils of the armature so that a rotating magnetic field will be produced which will rotate in opposition to the rotation of the disk, and a stationarily held coil placed in said field.

In testimony whereof I have hereunto set my hand, in the presence of two subscribing witnesses.

LOUIS W. SOUTHGATE.

Witnesses:
E. M. ALLEN,
C. FORREST WESSON.